United States Patent Office 3,498,350
Patented Mar. 3, 1970

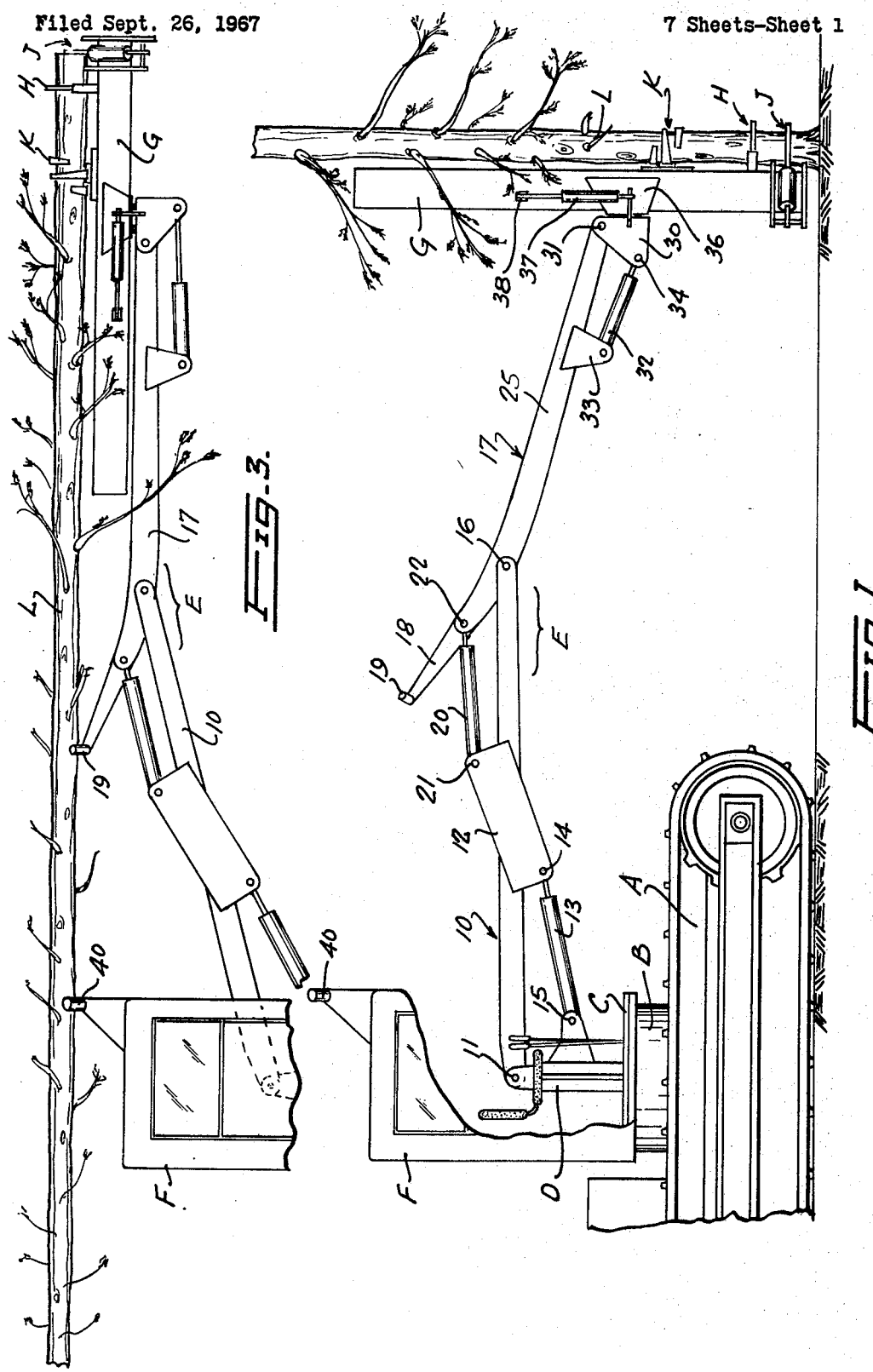

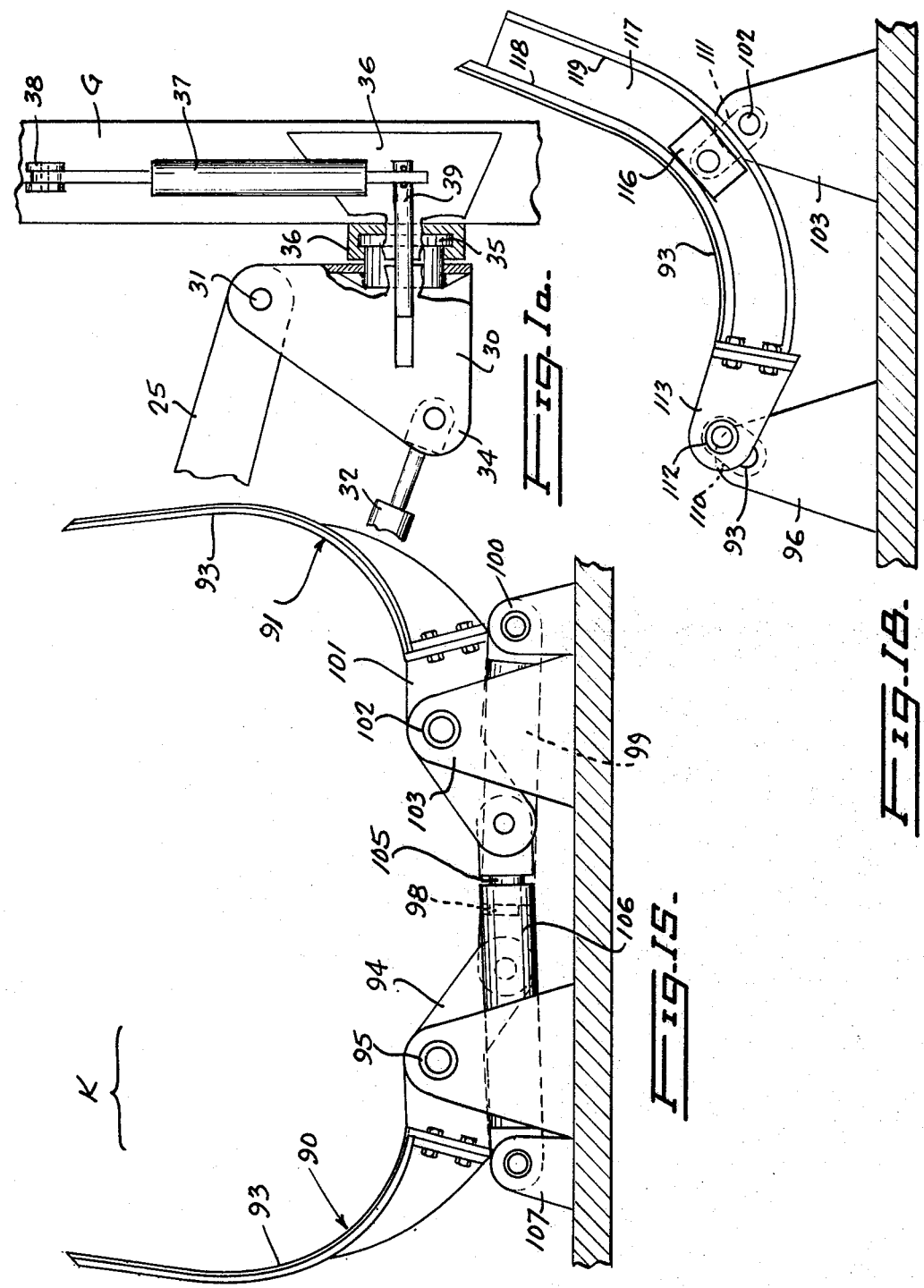

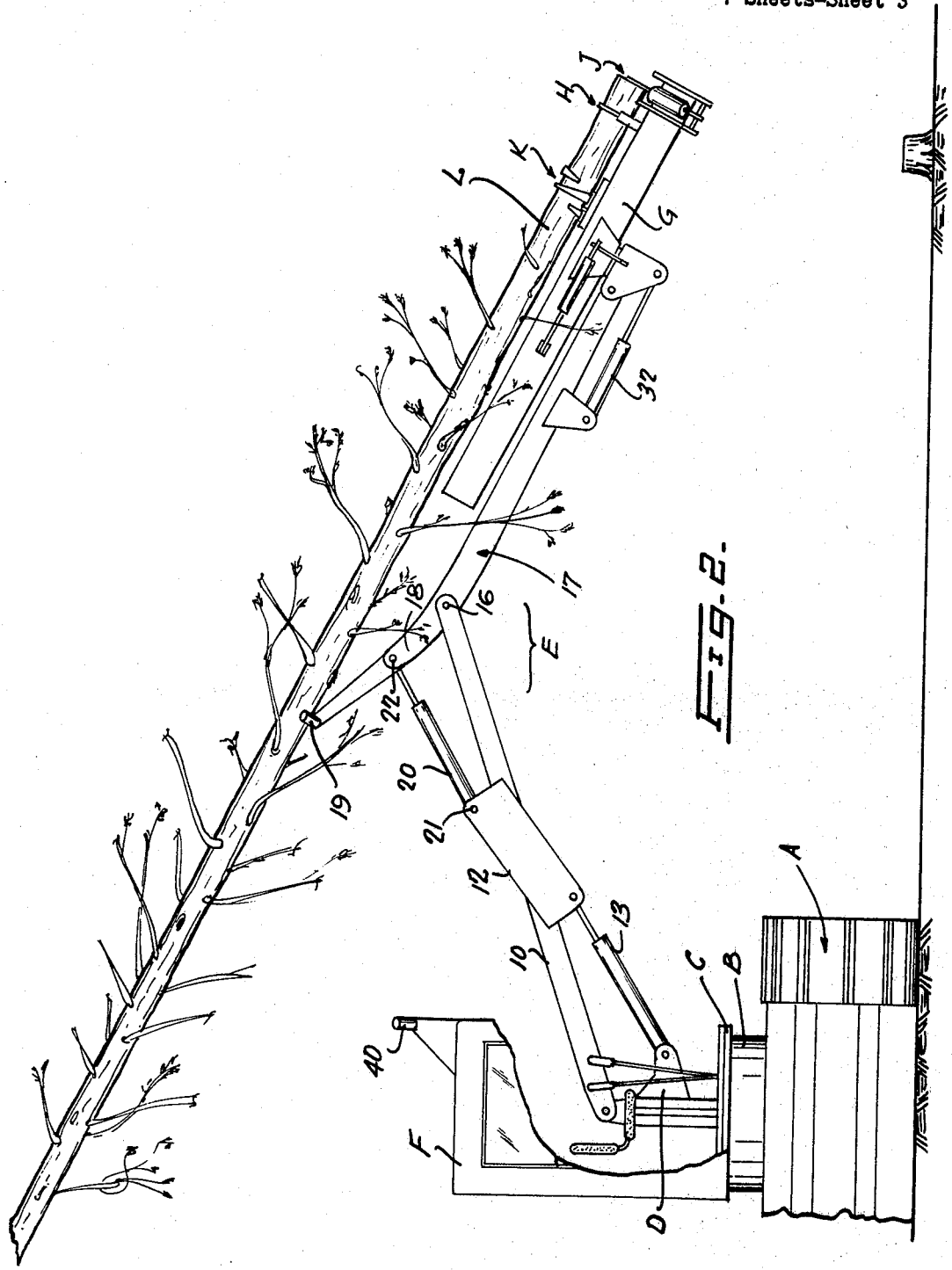

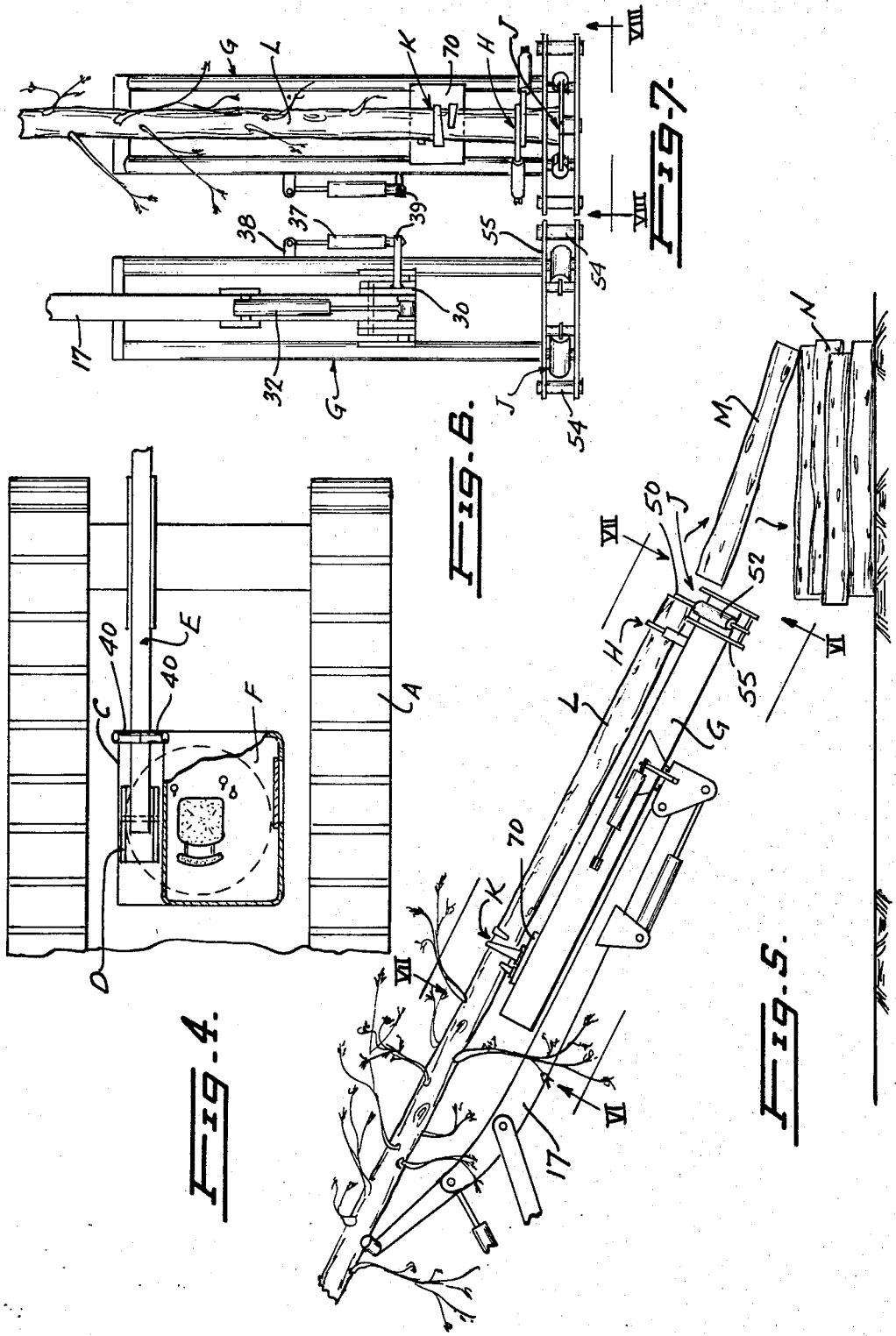

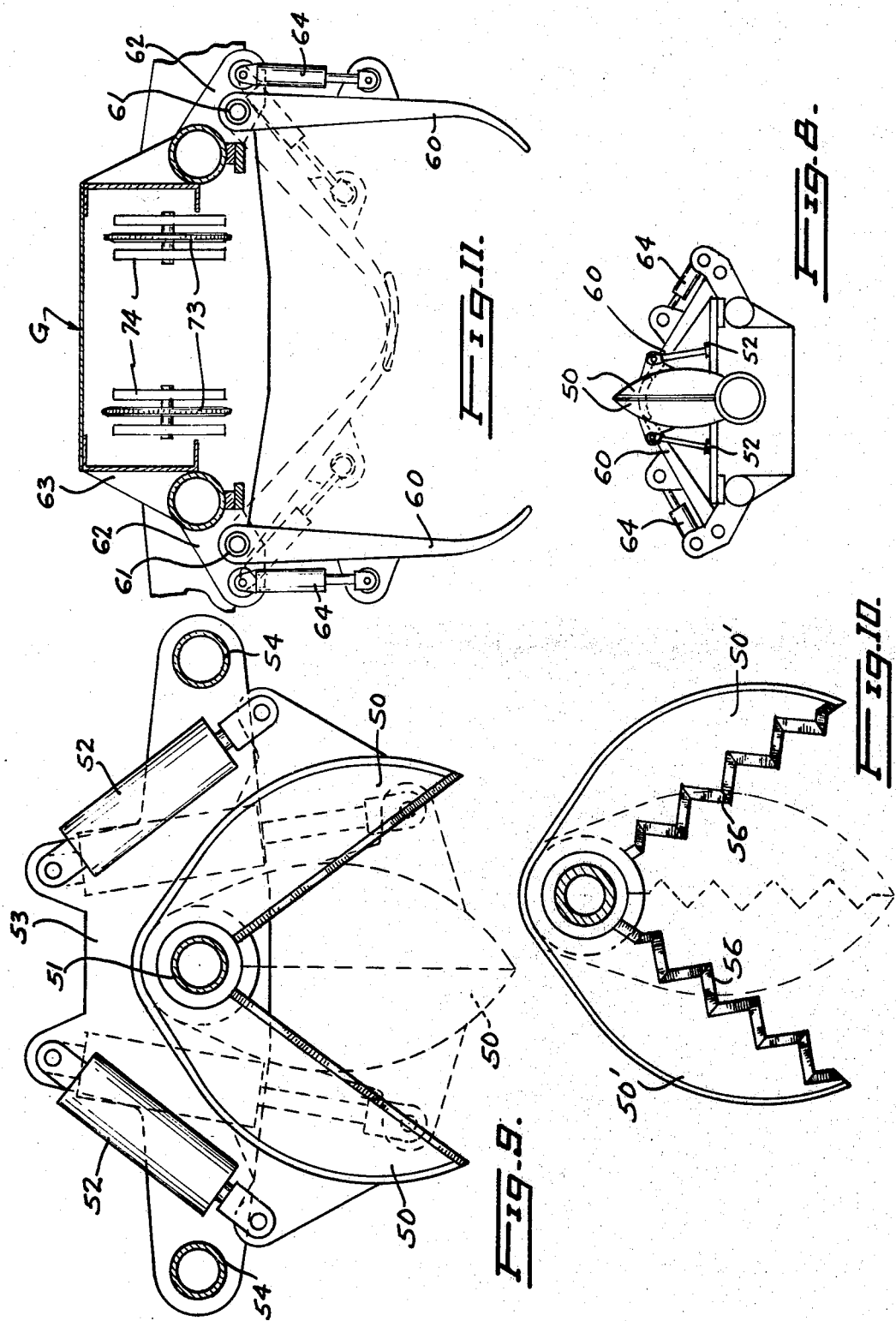

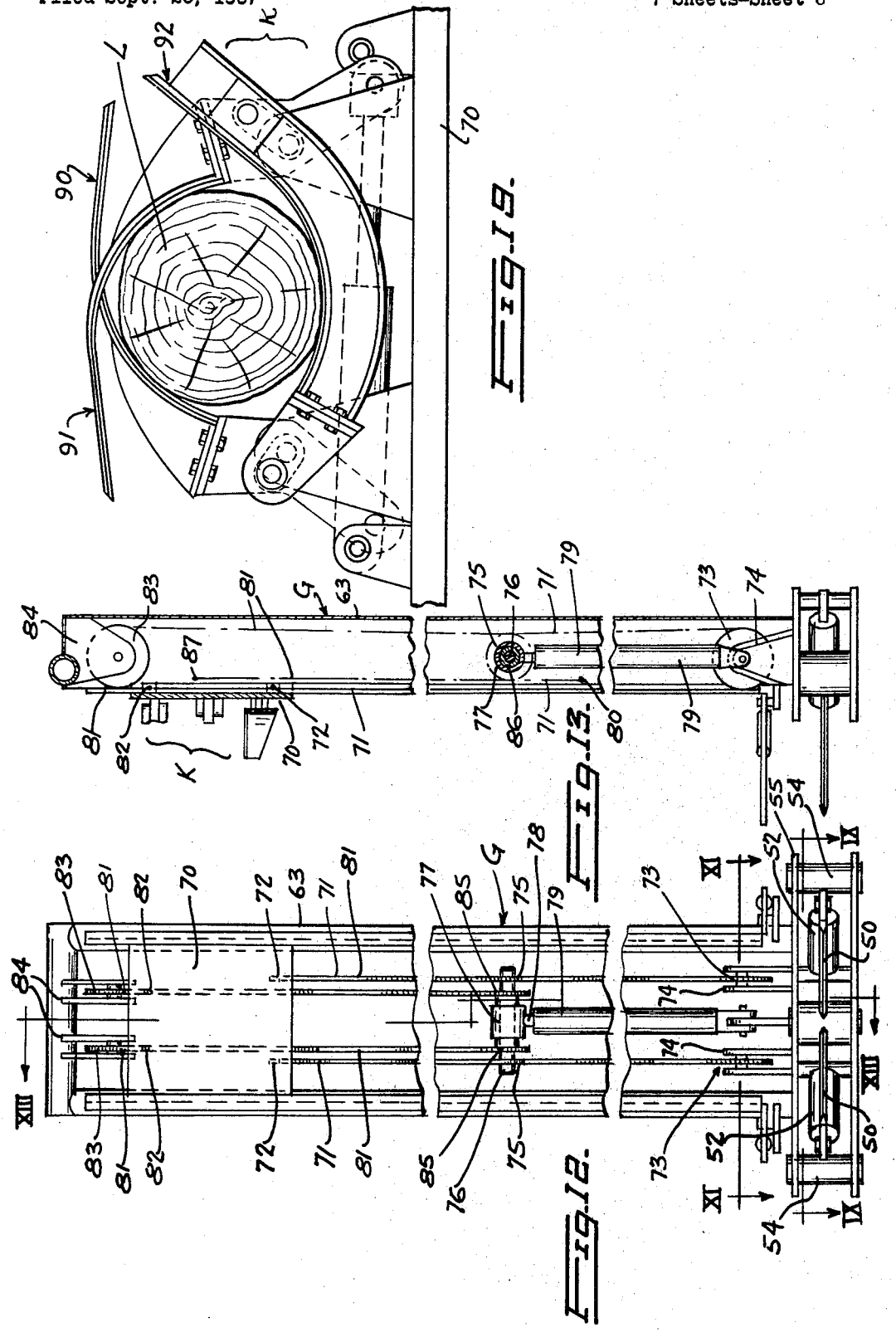

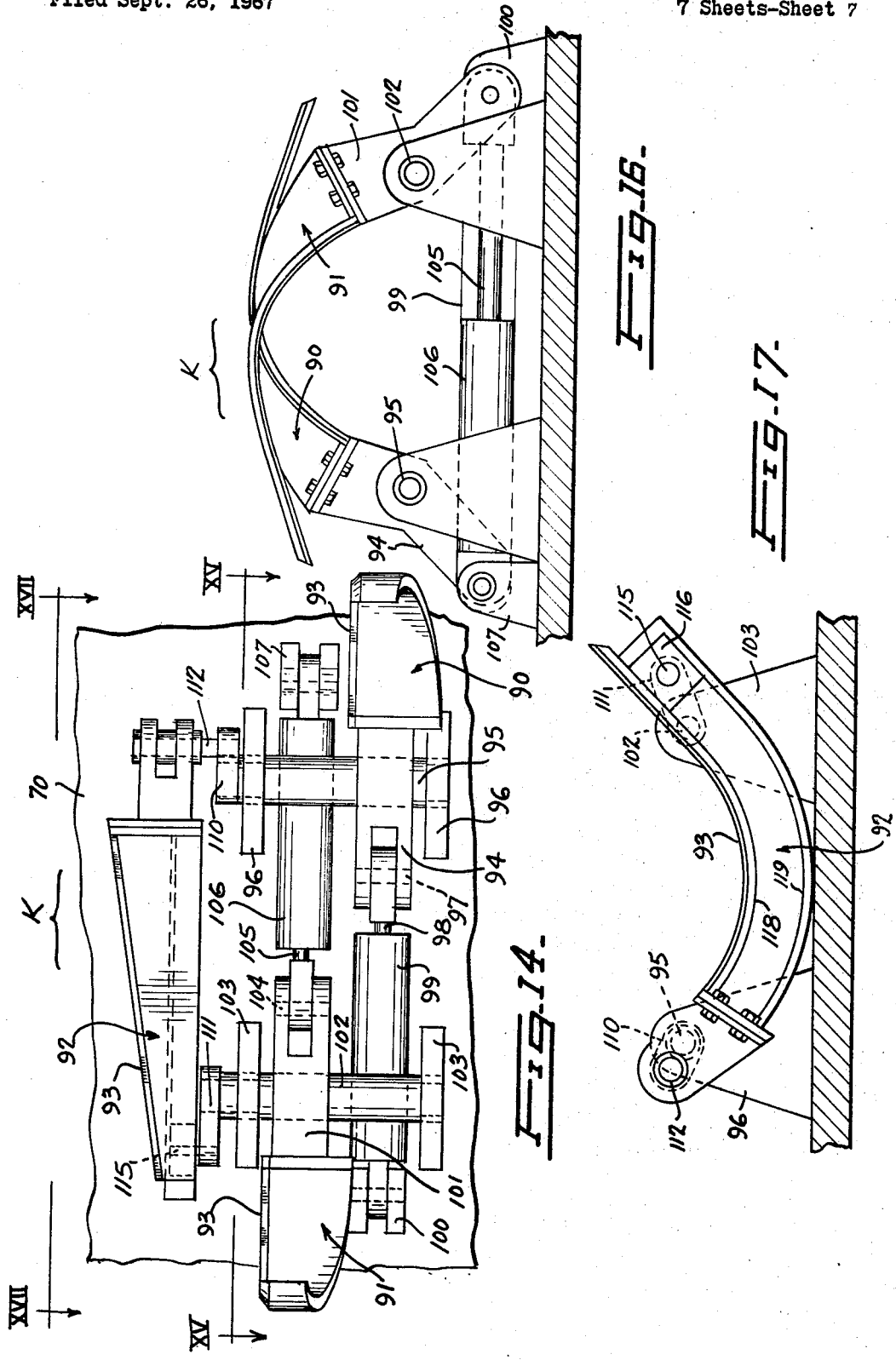

3,498,350
TIMBER HARVESTING
Edward D. Maradyn, Fort William, Ontario, Canada, assignor to The Northern Engineering & Supply Co., Limited, Fort William, Ontario, Canada
Filed Sept. 26, 1967, Ser. No. 670,567
Claims priority, application Canada, Aug. 15, 1967, 997,887
Int. Cl. B27b *1/00*
U.S. Cl. 144—309                                    8 Claims

ABSTRACT OF THE DISCLOSURE

A timber harvesting machine and method in which a standing tree is grasped by a tree processing unit tiltably supported on the end of an extensible boom mounted on a vehicle.

The processing unit has a shear mechanism to cut down the tree, a grasping mechanism to hold the tree trunk and a slidable delimbing unit to remove branches. As well as cutting the tree down, the delimbing unit and shear mechanism cooperate to buck the tree into bolts.

The delimbing unit is formed of three blades movable between an open position for receiving the tree trunk and a closed position in which the trunk is fully encircled by the blades.

---

This invention relates to a timber harvesting machine and method, and is more particularly concerned with a manner of timber harvesting in which a tree handling unit is mounted on an extensible boom that projects outwardly from a vehicle so as to be able to engage a standing tree.

Machines operating in this manner have already been proposed, but they all suffer from various disadvantages. There is a type of machine that processes the tree while it remains standing (i.e. delimbing the full length of the tree, cutting off its top, and finally severing the trunk from its stump). This type of machine is essentially a "whole-tree" machine, however. It does not buck the tree into bolts, but leaves this process step to be performed after the tree has been transported out of the forest. Machines have also been developed in which processing, including bucking, is carried out on the body of the vehicle itself.

The present invention is based on the concept of performing the entire processing operation (including bucking) by means of the tree handling unit that is mounted on the extensible boom. This unit thus performs a dual function, namely handling the tree for the purpose of cutting it down, as well as fully processing it subsequently, i.e. delimbing and bucking. It is true that this arrangement has the disadvantage that, so long as the unit remains occupied in the subsequent processing of a felled tree (i.e. one that has been severed from its stump, but not necessarily allowed to fall to the ground) it cannot be used to fell a further tree. The machine is thus unable to achieve the temporal overlap obtainable with some prior machines, whereby the boom can be used to fell a second standing tree simultaneously with the processing of the first. This disadvantage is, however, more than offset in the present machine by the simplicity of construction that flows from its method of operation and the consequent substantial reduction in the initial cost of the machine.

A further advantage of mounting the processing unit at the free end of the boom resides in the fact that this arrangement leaves the vehicle itself free of additional equipment. As a consequence, the vehicle can be a standard wheeled or track vehicle, to which there must be added merely the necessary particular boom structure and tree processing parts associated therewith. This ability to use a standard vehicle that is also useful, for example, as a skidder with only minor and relatively superficial changes, represents a most important practical advantage; in comparison with prior forms of timber harvesting machines, all of which have required specially built vehicles, or the major adaptation of an existing style of vehicle.

The present machine also has the advantage over many of the prior art proposals that it bucks the tree trunk into bolts in the tree processing unit mounted at the end of the boom, this arrangement facilitating stacking of the bolts, as they are cut. Since the boom end is movable and tiltable, the bolts can be stacked at any desired location on the ground within the reach of the boom, or on some further transportation means, such as a truck.

The present invention is also concerned with an improved delimbing unit that has been developed more especially to form part of the tree processing unit mounted on the boom, but which can also be used in other timber processing machines. This improved delimbing unit comprises a set of three cutting blades mounted for coordinated movement between an open, tree-receiving condition and a closed, tree-embracing condition, in which latter the blades fully encircle the tree trunk.

Other features and advantages will become apparent from the specific description below and the scope of the invention is set out in the appended claims. The specific description is to be read in conjunction with the accompanying drawings which illustrate by way of example one form of timber harvesting machine embodying the invention.

In the drawings:

FIGURE 1 is a general side view of the machine, partly cut away;

FIGURE 1a is an enlarged fragment of the machine of FIGURE 1;

FIGURE 2 is a view similar to that of FIGURE 1, but showing the parts at a later stage in a tree-harvesting operation;

FIGURE 3 is a fragmentary view showing the boom of the machine and demonstrating yet another position that the parts may occupy;

FIGURE 4 is a partial plan view of the vehicle portion of the machine seen in FIGURE 1;

FIGURE 5 is another fragmentary view of the boom of the machine demonstrating its operation;

FIGURE 6 is a view on the line VI—VI in FIGURE 5;

FIGURE 7 is a view on the line VII—VII in FIGURE 5;

FIGURE 8 is a view on the line VIII—VIII in FIGURE 7;

FIGURE 9 is an enlarged view of the shear mechanism alone, as seen on the line IX—IX in FIGURE 12;

FIGURE 10 shows a fragment of FIGURE 9, demonstrating an alternative;

FIGURE 11 is a cross-sectional view of the tree processing post taken on the line XI—XI in FIGURE 12 and showing the tree clamping mechanism;

FIGURE 12 is a front view of the tree processing post with its front plate removed to show the inner parts;

FIGURE 13 is a transverse section of the post of FIGURE 12, taken on the line XIII—XIII in FIGURE 12;

FIGURE 14 is a front view of the entire delimbing unit in the open position;

FIGURE 15 is an end sectional view of the delimbing unit taken on the line XV—XV in FIGURE 14;

FIGURE 16 is a view similar to FIGURE 15, but showing the parts of the delimbing unit in the fully closed position;

FIGURE 17 is an end view of the third cutting knife only of the delimbing unit in one position corresponding to the open position of such unit and with the remainder of the unit omitted;

FIGURE 18 is a view similar to FIGURE 17 showing the third cutting knife in the other extreme position corresponding to the closed position of the unit; and FIGURE 19 is an end view of the entire delimbing unit showing it in an intermediate position embracing a tree.

Overall construction of the machine

The main portions of the timber harvesting machine shown in FIGURES 1 to 4 comprise a vehicle A, which may be a wheeled vehicle but is preferably of the endless track variety as shown, such vehicle A including a centrally located mounting B for a rotatable platform C on which there is supported a stanchion structure D supporting a boom E, and an operator's cab F. The timber harvesting assembly consists of the boom E and the parts supported thereby.

The boom E consists of an inner arm 10 pivotally connected to the structure D by a pin 11 and having a plate 12 connected to it, with an expansible hydraulic piston and cylinder assembly 13 connected between pins 14 and 15 on the plate 12 and structure D respectively. Expansion of the assembly 13 has the effect of raising the boom arm 10 in the manner indicated in FIGURE 2.

At its remote end, the inner boom arm 10 pivotally supports at a pin 16 an outer boom arm 17, an upper portion 18 of which supports a tree cradle 19 at its remote end. A further expansible hydraulic piston and cylinder assembly 20 is connected by pins 21 and 22 between the plate 12 and the arm portion 18. As is also apparent from FIGURE 2, expansion of this assembly 20 produces a clockwise rotation of the outer boom arm 17 about the pin 16.

The lower portion 25 of the boom arm 17 carries at its remote end a tree processing post G on which there are mounted three mechanisms: a tree clamping mechanism H; a tree shearing mechanism J; and a delimbing unit K. Details of these mechanisms are set out individually below. The post G is mounted on the arm 17 by means of a bracket structure 30 which is pivotally connected by a pin 31 to the end of the lower portion 25 of the outer boom arm 17. A further expansible hydraulic piston and cylinder assembly 32 acts between a bracket 33 on the arm portion 25 and a rearwardly projecting portion 34 of the bracket structure 30, to swing the post G between the erect position shown in FIGURE 1, in which it is generally perpendicular to the outer boom arm 17 with the latter fully extended, and the position shown in FIGURES 2 and 3 in which it extends parallel to the arm 17.

Adjustment of the orientation of the post G about a horizontal axis perpendicular to that defined by the pin 31, to accommodate transversely sloping terrain or a tree that is not standing truly vertically, is provided by means of a journal 35 (FIGURE 1a) mounted between plates of the bracket structure 30 and serving to support pivotally an embracing member 36 secured to the post G. Control of this movement is exercised by a double-acting hydraulic piston and cylinder assembly 37 located to one side of the post G and extending between a connection at 38 to the post and an arm 39 that extends forward and outwardly from the bracket structure 30.

FIGURE 3 further demonstrates the manner in which a cut tree L may be supported, not only by the post G and the cradle 19 on the arm 17, but also by a further cradle 40 projecting upwardly and sidewardly from the top of the cab F.

Construction of the tree shearing and clamping mechanisms

The tree shearing mechanism J which is best shown in FIGURE 9 is located at a predetermined fixed location near the foot of the post G and consists of a coplanar pair of sharpened blades 50 mounted for rotation about a pivot pin 51 under the action of a pair of double-acting hydraulic cylinder assemblies 52. A frame portion 53 of the mechanism supports the pin 51 and is secured by side posts 54 to a framework 55 (FIGURE 12) secured to the bottom end of the post G.

FIGURE 10 shows a fragment of an alternative construction employing blades 50' in which the cutting edges 56 are formed of zig-zag shape.

Immediately above the tree shearing mechanism J there is located the tree clamping mechanism H, which, as best seen from FIGURE 11, consists of a pair of tree embracing arms 60 each mounted to pivot about a respective pivot pin 61 supported in brackets 62 connected to the general frame 63 of the post G. The arms 60 are movable by double-acting hydraulic cylinder assemblies 64 between their open position shown in full lines in FIGURE 11 and a fully closed position shown in broken lines in FIGURE 11.

Mounting of the delimbing unit on the tree post

The delimbing unit K is mounted on a plate 70 that is arranged to slide along the post G, for which purpose it has four chains connected to it (see FIGURES 12 and 13). Each of a first pair 71 of these chains extends from a connection 72 to the plate 70 in a downward direction and around one of a pair of free-running sprockets 73 mounted at the foot of the post G by brackets 74. The chains 71 return upwardly (as seen on the right-hand side of FIGURE 13) to pass around a respective one of a pair of sprockets 75 mounted on the ends of an inner shaft 76 that is free to rotate within a bushing 77 mounted on the end of a piston 78 associated with a double-acting hydraulic cylinder 79. Each chain 71 finally extends to a connection 80 secured to the frame 63 of the post G.

Each of the second pair of chains 81 passes from a fixed connection 82 near the top of the plate 70, around one of a pair of free-running sprockets 83 supported in brackets 84 at the head of the post G, and hence down (on the right-hand side of FIGURE 13) to pass around a second pair of free-running sprockets 85 mounted on an outer shaft 86 which is supported by and free to turn within the bushing 77 independently of the shaft 76. From here, each of the chains 81 extends upwardly again to a connection 87 fixed to the frame 63 of the post G.

It will be apparent that projection and withdrawal of the piston 78 in the cylinder 79 will have the effect of moving the plate 70 first down and then up along the post G for the performance of a delimbing operation in the manner described below. Thus this piston and cylinder combination constitutes power operated means for driving the delimbing unit in both directions along the post towards and away from the shearing mechanism.

Construction of the delimbing unit

The delimbing unit K consists of three curved blades 90, 91 and 92, each having a sharpened edge 93 for cutting through branches projecting from a tree trunk being processed.

The lowermost blade 90 is mounted on a bracket 94 connected to a shaft 95 that is pivotally mounted in supports 96 projecting outwardly from the plate 70. The bracket 94 is also coupled by a pin 97 to the piston 98 of a double-acting hydraulic cylinder 99, the other end of which is anchored to the plate 70 by a support 100. In a like manner, the second blade 91 is supported by a bracket 101 connected to a shaft 102 journalled in supports 103, bracket 101 being coupled by a pin 104 to the piston 105 of a second double-acting hydraulic cylinder 106, the other end of which is secured to the plate 70 by a support 107. The respective ends of the two cylinders 99 and 106 are connected in parallel with each other and to a source of pressure oil, so that they are both moved to the retracted position shown in FIGURES 14 and 15 (with the blades 90 and 91 in their open position) or to their extended position to close the blades 90 and 91 in the manner demonstrated in FIGURE 16.

The third or uppermost blade 92 is shown alone in its two extreme positions in FIGURES 17 and 18 respectively, in order to simplify illustration. The two ends of this blade are mounted respectively on crank arms 110 and 111 that are respectively connected to shafts 95 and 102. The crank arm 110 on the shaft 95 carries a pin 112 on which there is rotatably mounted a bracket 113 secured to a first end of the blade 92. At the other end of this blade the crank arm 111 carries a pin 115 that is pivotally mounted in a plate 116 arranged to slide in a track 117 formed between surfaces 118 and 119 of the blade 92. FIGURE 18 demonstrates the manner in which counter-rotation of the shafts 95 and 102 will have the effect of elevating the blade 92 from its withdrawn position of FIGURE 17 to its projecting position of FIGURE 18.

FIGURE 19 perhaps best demonstrates the manner in which the three blades cooperate with each other to embrace a tree L from three sides and to provide an uninterrupted cutting surface surrounding the tree, thus ensuring removal of substantially all lateral projections from the tree surface whenever the delimbing unit K is caused to travel along it.

Operation of the machine

The operator drives the machine into the vicinity of a stand of trees that are to be felled. He extends the boom E with the tree post G in the vertical orientation and with the various mechanisms thereon all in open condition. Having selected a tree L, he closes the arms of the tree clamping mechanism H around such tree, as well as the blades of the delimbing unit K, to bring the parts to the condition shown in FIGURE 1. It will be noted that the delimbing unit K is now in a position near the foot of the post G. This unit K may now be raised up along the tree while the same remains standing, in order to delimb the first few branches therefrom. Alternatively, the tree shearing mechanism J may first be operated to cut through the tree near the ground and separate it from its stump. In other words, although these two steps must both be performed, their temporal relationship to each other is unimportant. FIGURE 2 demonstrates the situation that exists after this latter method of operation has been adopted, i.e. shearing before delimbing the boom E having been raised somewhat and the tree post G having been turned to its tilted orientation parallel with the outer boom arm 17. Depending upon the length and weight of the tree trunk, this upward movement of the boom E may be continued until the position illustrated in FIGURE 3 is reached, with portions of the tree resting on the cradles 19 and 40. It will be noted that the degree of tilt in either the FIGURE 2 or the FIGURE 3 orientation is considerable, the tree and post G now extending with at least as great a horizontal component as vertical, i.e. having been tilted through at least 45°. The dimensions of the machine are such that when a tall tree is being processed and is in the position of FIGURE 3, it will project at least as far to the left as to the right of the cradle 40. The centre of gravity of the tree will then tend to be approximately directly over the vehicle A, which avoids excessive overturning loads. Once the machine starts to process such a tree, or in the case of a tree that is relatively short in the first instance, its centre of gravity will move to the right of the cradle 40. However, under these circumstances the weight of the tree will be insufficient to represent a significant factor in relation to overturning forces and can adequately be taken into account in the design of the vehicle A without necessitating an excessively heavy construction thereof.

The tree processing post G is now employed to delimb and buck bolts from the tree. This can be carried out with the boom either in the orientation of FIGURE 2 or FIGURE 3, and has been illustrated in FIGURE 5 in the former orientation. Firstly, the delimbing unit K is driven up the tree trunk by its hydraulic cylinder 79. The pressure in the cylinders 64 of the tree clamping mechanism H is then relaxed at least partially to open the tree embracing arms 60, that is to say, to an extent sufficient to allow the tree trunk to slide therethrough but insufficient to release it altogether. The delimbing unit K is then driven back down the post G while still in its tree embracing closed condition, thus moving the tree trunk with it, the blades of the tree shearing mechanism J being open at this time. In the orientation of FIGURE 5 this movement is assisted by gravity.

The travel of the delimbing unit K is made equal to the length of the bolts required, so that when this unit reaches its lowermost position on the post G, the tree shearing mechanism J can be actuated to cut through the tree trunk and produce a bolt M. This operation is preferably carried out with the machine in a location such that the bolt M falls onto an existing stack N of similar bolts that have previously been cut from the same or earlier processed trees. It will be appreciated that the reach obtainable by means of the boom E enables the machine to move from tree to tree in a stand, process them, and finally collect the bolts in a common stack for subsequent removal by a skidding vehicle or other means.

The tree clamping mechanism H is now retightened to hold the tree trunk firmly in the post G again. The delimbing unit K is again run up the post G to delimb another series of branches, and the process just described is repeated as many times as is necessary. When a position near the top of the tree has been reached at which the timber is no longer useful, the boom E is moved to a location at which the tree tops are to be dumped, the various mechanisms holding the tree are released and the post G is oriented to discard the remainder of the tree.

I claim:

1. In a method of harvesting timber by employing a self-propelled vehicle having an extensible boom projecting therefrom with said boom carrying a tree processing unit on a remote portion thereof, said tree processing unit comprising a post structure, clamping means mounted on said post structure for clamping a tree trunk thereto, shear means mounted at a predetermined location on said post structure for cutting through said tree trunk, tree-embracing delimbing means, and power operated means mounting said delimbing means movably on the post G is oriented to discard the remainder of the tree, prising:

(a) moving said vehicle and said boom to locate and orient said unit to engage a standing tree,
    (b) actuating said clamping means to clamp said tree to said post structure,
    (c) causing said delimbing means to embrace and further support said tree on said post structure,
    (d) actuating said shear means to cut through said tree below said clamping and delimbing means, to sever the tree from its stump,
    (e) driving said delimbing means along said post structure in a direction away from said shear means to perform a delimbing operation on said tree with the latter held by said clamping means,
    (f) said steps (d) and (e) being performed without regard to the temporal relationship therebetween,
    (g) subsequently driving said delimbing means in a direction towards said shear means with the latter in open position and with said clamping means relaxed to feed the delimbed portion of said tree along said post structure relative to said shear means, and
    (h) again actuating said shear means to buck a bolt from said delimbed portion of the tree.

2. A method according to claim 1, comprising repeating steps (e), (g) and (h) to produce a series of similar delimbed bolts, and depositing said bolts to form a stack thereof for subsequent removal.

3. A method according to claim 1, including the step of inclining said tree processing unit relative to the vertical after the tree has been severed from the stump, and carrying out said feeding and bucking steps (g) and (h) with the tree processing unit in such inclined orientation, the inclination being in the direction and by an extent sufficient to move the upper part of the tree towards a location above the vehicle.

4. A timber harvesting assembly comprising:
   (a) an extensible boom having a first portion for mounting on a self-propelled vehicle,
   (b) a tree processing unit mounted on a second portion of said boom remote from said first portion,
   (c) and means connecting to said boom for locating and orienting said unit to engage a standing tree remote from said vehicle,
   (d) said tree processing unit comprising
      (i) a post structure,
      (ii) means mounted on said post structure for clamping a tree trunk thereto,
      (iii) shear means mounted at a predetermined location on said post structure for cutting through a said tree trunk,
      (iv) tree-embracing, delimbing means,
      (v) and means mounting said delimbing means movably on said post structure including power operated means for driving said delimbing means in both directions along said post structure for travel along a said tree trunk held against said post structure by said clamping means in a first direction away from said shear means to perform a delimbing operation on said tree trunk and subsequently in a second direction towards said shear means to feed the delimbed portion of said tree trunk along said post structure relative to said shear means to locate said delimbed portion of the tree trunk beyond said shear means for bucking into a bolt thereby.

5. A timber harvesting assembly according to claim 4, wherein said delimbing means comprise
   (a) a framework,
   (b) three cutting blades,
   (c) a pair of parallel shafts each rotatably mounted on said framework and each carrying one of a first two of said blades,
   (d) means for counter-rotating said shafts for moving said first two blades between an open tree-receiving condition and a closed tree-embracing condition,
   (e) a crank arm on each of said shafts,
   (f) means mounting each of the ends of said third blade on a respective one of said crank arms to move said third blade between a withdrawn position when said first two blades are in said open condition and a position projecting towards said first two blades when said first two blades are in said closed condition, the three blades in said closed condition together encircling said tree trunk.

6. An assembly according to claim 4, including means for tilting said tree processing unit relative to the boom in the direction to move an upper part of said unit nearer to the first portion of the boom than a lower part of said unit, said tilting means being constructed for tilting said unit through an angle sufficiently large to impart a horizontal component of inclination to said unit at least as great as its vertical component.

7. In a timber harvesting machine, a delimbing mechanism comprising
   (a) a framework,
   (b) three cutting blades,
   (c) a pair of parallel shafts each rotatably mounted on said framework and each carrying one of a first two of said blades,
   (d) means for counter-rotating said shafts for moving said first two blades between an open tree-receiving condition and a closed tree-embracing condition,
   (e) a crank arm on each of said shafts,
   (f) means mounting each of the ends of said third blade on a respective one of said crank arms to move said third blade between a withdrawn position when said first two blades are in said open condition and a position projecting towards said first two blades when said first two blades are in said closed condition, the three blades in said closed condition together defining a total enclosed space to receive a tree trunk to be delimbed.

8. A machine according to claim 7, further including
   (i) a post structure,
   (ii) means mounted on said post structure for clamping a tree trunk thereto,
   (iii) shear means mounted on said post structure for cutting through a said tree trunk,
   (iv) and means mounting said delimbing mechanism movably on said post structure for travel along a said tree trunk held against said post structure by said clamping means in a first direction away from said shear means to perform a delimbing operation on said tree trunk and subsequently in a second direction towards said shear means to feed the delimbed portion of said tree trunk along said post structure relative to said shear means to locate said delimbed portion of the tree trunk beyond said shear means for bucking into a bolt thereby.

References Cited

UNITED STATES PATENTS 3,140,736   7/1964   Propst _____ 144—309
3,385,333   5/1968   Eynon _____ 144—309

GERALD A. DOST, Primary Examiner

U.S. Cl. X.R.

144—2, 3, 34